Patented Mar. 21, 1933

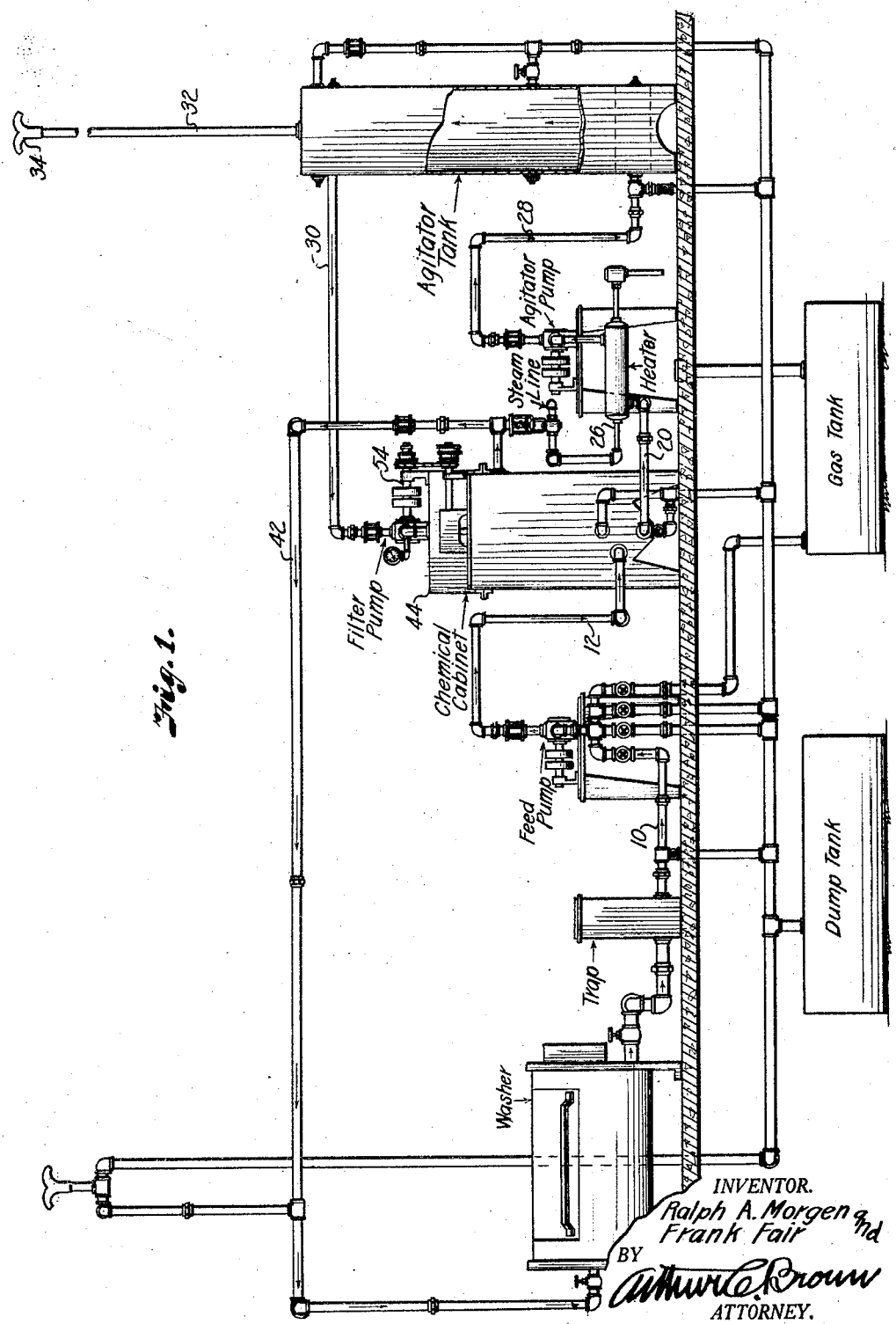

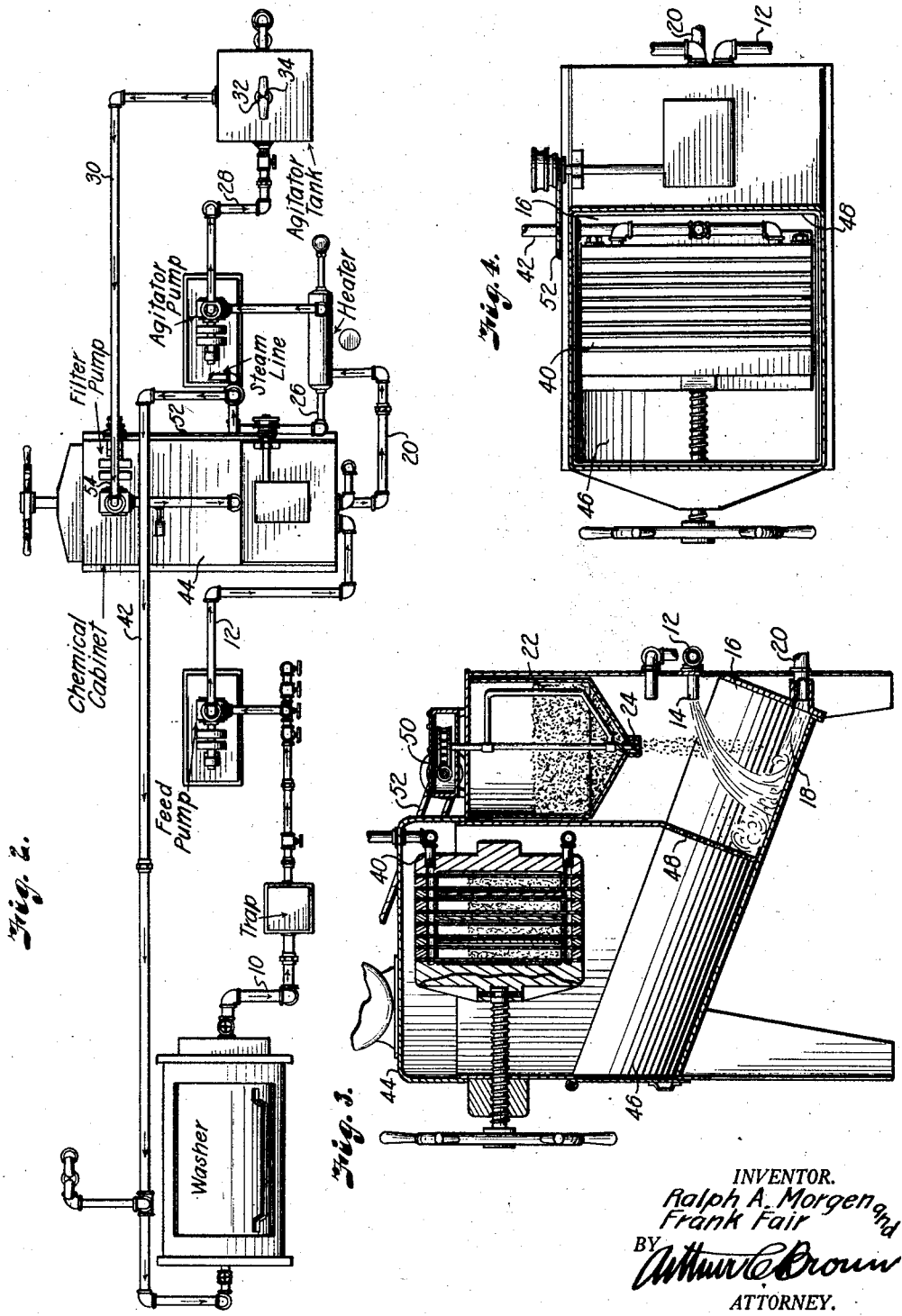

1,902,514

UNITED STATES PATENT OFFICE

RALPH A. MORGEN AND FRANK FAIR, OF KANSAS CITY, MISSOURI

PROCESS OF CLARIFYING DRY CLEANING FLUID

Application filed July 11, 1931. Serial No. 550,180.

This invention relates to a method of treating fluids to remove impurities, and more particularly to a method of treating a circulating stream of used dry cleaning solvent such as gasoline coming from a washer to clarify the stream for return to the washer.

The principal object of this invention is to provide a method for treating used dry cleaning fluid with an agent such as a chemical to be mixed with dirty solvent for effecting maximum contact of the agent with impurities and maximum extent of chemical reactions without unduly increasing the amount of fluid required for maintaining the circulating system full of fluid.

A particular object of this invention is to provide apparatus for employing the materials for purifying used dry cleaning fluid disclosed in the pending application of Ralph A. Morgen for patent on "process of clarifying dry cleaning fluids", Serial No. 471,436, whereby a single mixture of chemical materials may completely purify a body of dirty fluid and whereby the use of strong alkalis such as caustics, and the additional steps necessary to reduce the possibly harmful effects of the caustics, may be avoided.

Other objects of this invention will appear in the course of the following description of one form of apparatus adapted for carrying out the improved process, and illustrated in the accompanying drawings, wherein:

Fig. 1 is a side elevation of a dry cleaning system including clarifying elements operable in accordance with the invention, a supporting floor being shown in section, and the wall of an agitator tank being partly broken away to better indicate its character.

Fig. 2 is a plan view of the system.

Fig. 3 is a vertical section through a housing containing a filter, and showing the relation of a feed hopper to a liquid collecting tank for introducing a treating agent into the liquid inlet and outlet pipes being shown fragmentarily.

Fig. 4 is a plan view of the housing shown in Fig. 3, the filter-containing portion of the housing being shown in cross section on a line above the filter.

Referring in detail to the drawings:

The system illustrated includes a washer, which may be of ordinary construction, and a suction feed pump which draws dirty used solvent from the washer through a conduit 10 and delivers the stream through a conduit 12 to an agitator, a chemical treating agent being introduced to the dirty solvent at any desired position in the system.

The chemical treating agent is preferably introduced into dirty solvent in the portion of the system including the washer and the agitator to cause the chemical to move with the stream of dirty solvent that passes from the washer to the agitator, and means are provided for introducing a gaseous treating medium to the stream.

In a preferred series of steps which will be particularly described, a dry chemical agent is automatically fed into the stream of dirty solvent at a point between the washer and the agitator, and air is introduced to the stream coincidently with the chemical agent.

The conduit 12, in the form of apparatus and system illustrated, has a nozzle-like outlet end 14 located to deliver dirty fluid to a collecting basin 16 in the chemical cabinet shown in section in Fig. 3 and later more particularly described. A trap is interposed in the conduit 10 to collect buttons and like débris carried by the stream.

The basin 16 has a slanting bottom forming a sump portion 18 to which an outlet conduit 20 is connected.

The nozzle 14 projects inwardly from the wall of the cabinet whereby the incoming liquid is discharged in order to mix with the treating chemical.

A hopper 22 suspended in the cabinet above the basin and having flanges resting on the cabinet contains a quantity of a treating agent in particle and preferably powdered form, which is fed by a screw 24 to fall into and mingle with the liquid in the basin.

The mixture of liquid and treating agent is drawn from the basin 16 by an agitator pump through a heater which may consist of a cylinder interposed in the conduit 20 between the basin and the pump.

Suitable means for heating the liquid may include a steam line having a portion 26 extending through the cylinder. A heat regulator is provided to adjust the heat to the rate of movement of liquid through the heater, and to the heat requirements of action between impurities in the stream of liquid, and the treating agent and air admitted to the stream.

The agitator pump is operated at a faster rate than the feed pump to carry away the liquid faster than it is delivered to the collecting basin; as a result, there will be no constant level of liquid in the sump 8, and a gaseous treating agent, in this instance air, is drawn through the mouth of the conduit 20 with liquid and undissolved chemicals. The air agitates the mixture of liquid and treating agent to give better contact, and prevent settling in the agitating tank. The air likewise acts as an oxidizing agent on some of the impurities in the presence of the treating agent.

Attention is called to the fact that the inlet end of the conduit 20 is located at the bottom of the sump 18 so that materials deposited on the sloping bottom will tend to flow into the conduit. The suction feed pump delivers dirty liquid at sufficient pressure to cause discharge of the stream substantially to the high end of the sloping bottom and thus wash chemicals falling from the container 22 into the conduit 20. Atmosphere has free access to the basin 16 and sump 18.

The air, liquid and treating agent become thoroughly mixed while passing through the agitator pump, and are delivered by pressure of the pump through a conduit 28 to the bottom portion of an agitator tank shown at the extreme right in Figs. 1 and 2.

The agitator tank is vertically elongated so that its upper end extends a substantial distance above the floor on which the apparatus is supported, and has a return conduit 30 connected with the upper end portion thereof. Incoming liquid delivered under pressure by the agitator pump is thus forced in a jet in a horizontal path into the lower portion of the body of liquid in the tank.

The incoming stream of liquid, containing air and treating agent, is thus mixed under violent agitation with liquid mixture collected in the tank, and contact of air and treating agent with the impurities carried by the liquid is promoted.

The tank may be relatively small in cross section, to reduce the amount of liquid required to fill the tank, the principal requirements being that incoming liquid move a substantial length of time in contact with the chemical.

Gases including air are led off from the tank through a vertical pipe 32 extending a substantial distance above the tank and provided with a vent 34.

Contact of air and treating agent with impurities is promoted and facilitated due to prolongation and slowing up of movement as the mixture rises to the top of the tank. A period of at least five minutes' contact is preferable.

The liquid passes from the tank by gravity through the conduit 30 toward a filter 40 preferably located in the chemical cabinet, and is pressed through the filter by the filter pump and back through a pipe 42 to the washer. The filter pump is larger than the agitator pump to take care of slippage as the pressure rises on the filter, and to move more slowly in order to minimize wear. The filter pump moves the stream of liquid sufficiently fast to maintain circulation.

The chemical cabinet preferably includes a portion 44 in which the filter is housed, to locate the filter above an extended portion 46 of the basin which is separated from the sump of the basin by a partition 48. Liquid dripping from the filter, for instance when the filter is opened to remove filter cakes, will fall to the inclined bottom of the basin extension, and collect in the recess defined by the partition and inclined bottom as shown in Fig. 3. Apertures in the partition permit the collected drainage liquid from the filter to enter the basin sump and unite with the stream of liquid passing through the conduit 20.

The screw for feeding chemicals to the stream of liquid is operated through a worm 50 by a belt 52 driven by a pulley 54 on the shaft of the filter pump, whereby the rate of feed is kept directly proportionate to the rate of movement of liquid by the filter pump, which in turn has constant relation to the rate of movement of liquid by the agitator pump.

The treating agent preferably includes a chemical in powdered form, which is adapted to react with impurities in the dirty solvent, so that the products of reaction may be collected by the filter. The apparatus is especially adapted for purifying a solvent with a single mixture of chemicals adapted to collect all unfilterable impurities from the dirty solvent and detrain said impurities when the chemicals are detained by the filter.

It is important that sufficient time be given for the chemicals to contact and react with impurities before the stream of circulating solvent reaches the filter. The better the contact between treating agent and liquid, the shorter the time necessary. The necessary contact and time are afforded by the process above described, without requiring an excessive amount of solvent in the system, and the solvent will be clarified without other and incidental rinsing or filtering.

What we claim and desire to secure by Letters Patent is:

1. The process of clarifying dry cleaning fluid including delivering the fluid and a cleaning compound to an open mixing basin, pumping the mixture from the basin in accelerated flow to effect addition of air to the mixture and promote agitation of the mixture, delivering the mixture into a body thereof in an accumulator, drawing off the mixture from the accumulator at a point sufficiently above its intake to provide a conditioning period between intake and outlet of the mixture, and filtering the drawn off mixture.

2. The process of clarifying dry cleaning fluid including delivering the fluid and a cleaning compound to an open mixing basin, pumping the mixture from the basin in accelerated flow to effect addition of air to the mixture and promote agitation of the mixture, delivering the mixture into a body thereof in an accumulator, drawing off the mixture from the accumulator at a point sufficiently above its intake to provide a conditioning period between intake and outlet of the mixture, filtering the drawn off mixture, and returning seepage from the mixture to the stream.

3. The process of clarifying dry cleaning fluid including delivering the fluid and a cleaning compound to an open mixing basin, pumping the mixture from the basin in accelerated flow to effect addition of air to the mixture and promote agitation of the mixture, heating the mixture, delivering the heated mixture into a body thereof in an accumulator, drawing off the mixture from the accumulator at a point sufficiently above its intake to provide a conditioning period between intake and outlet of the mixture, and filtering the drawn off mixture.

In testimony whereof we affix our signatures.

RALPH A. MORGEN.
FRANK FAIR.